US010773364B2

(12) United States Patent
Polofsky et al.

(10) Patent No.: US 10,773,364 B2
(45) Date of Patent: Sep. 15, 2020

(54) PINCH CLAMP REMOVAL TOOL AND METHOD

(71) Applicant: Conbraco Industries, Inc., Matthews, NC (US)

(72) Inventors: Jeffrey A. Polofsky, North Myrtle Beach, SC (US); Lisa A. Stokes, Charlotte, NC (US); John T. Hembree, Indian Trail, NC (US); Lei Zhang, Tianjin (CN)

(73) Assignee: Conbraco Industries, Inc., Matthews, NC (US)

( * ) Notice: Subject to any disclaimer, the term of this patent is extended or adjusted under 35 U.S.C. 154(b) by 408 days.

(21) Appl. No.: 15/452,143

(22) Filed: Mar. 7, 2017

(65) Prior Publication Data

US 2018/0257207 A1 Sep. 13, 2018

(51) Int. Cl.

| | |
|---|---|
| ***B23P 19/04*** | (2006.01) |
| ***B25B 27/14*** | (2006.01) |
| ***B25B 25/00*** | (2006.01) |
| ***B25B 13/48*** | (2006.01) |
| *B25B 13/06* | (2006.01) |

(52) U.S. Cl.

CPC ............ *B25B 27/14* (2013.01); *B25B 13/481* (2013.01); *B25B 25/005* (2013.01); *B25B 27/146* (2013.01); *B25B 13/065* (2013.01)

(58) Field of Classification Search

USPC .... 29/244; 81/121.1, 124.2, 124.3, 125, 901

See application file for complete search history.

(56) References Cited

U.S. PATENT DOCUMENTS

| | | | | |
|---|---|---|---|---|
| 1,181,565 | A * | 5/1916 | Block | B25B 13/48 251/288 |
| 5,327,802 | A | 7/1994 | Yu | |
| 5,791,208 | A * | 8/1998 | Grubbs | B25B 13/5091 81/121.1 |
| D421,882 | S * | 3/2000 | Mattei | 84/458 |
| 6,314,629 | B1 | 11/2001 | Showalter, Sr. et al. | |
| 6,708,461 | B1 | 3/2004 | Wise | |
| 7,434,440 | B2 | 10/2008 | Fay | |
| 8,677,864 | B1 * | 3/2014 | Wheeler | B25B 13/44 81/121.1 |
| 9,221,155 | B1 * | 12/2015 | Cantlon | B25B 13/06 |
| 2007/0012143 | A1 * | 1/2007 | Tracy | B25B 13/5091 81/124.2 |
| 2008/0314205 | A1 | 12/2008 | Feliciano | |

OTHER PUBLICATIONS

An excerpt from Wheeler-Rex Professional Tool Catalog, Issue 1, p. 57, www.wheelerrex.com (undated).

* cited by examiner

*Primary Examiner* — Joseph J Hail
*Assistant Examiner* — Shantese L McDonald
(74) *Attorney, Agent, or Firm* — Shumaker, Loop & Kendrick, LLP

(57) ABSTRACT

A pinch clamp removal tool that includes a tool body having a slot extending partially across a top portion of the tool body and adapted for receiving a nub extending radially-outwardly from a pinch clamp to be removed from a pipe and a stop positioned at an end of the slot for engaging the nub when the nub is positioned in the slot. The tool body is adapted for being rotated to impart a twist to the pinch clamp nub sufficient to break the nub in order to loosen the pinch clamp and permit removal of the clamp from the pipe.

7 Claims, 3 Drawing Sheets

PINCH CLAMP REMOVAL TOOL AND METHOD

TECHNICAL FIELD AND BACKGROUND OF THE INVENTION

This invention relates to a tool for removing pinch clamps from pipes and a method for removing pinch clamps from pipes. More specifically, the tool is intended to facilitate removal of pinch clamps from tubing, such as "PEX" flexible water pipe, where fittings have been inserted into the pipe end and clamped into the inserted position. A pinch clamp is an initially-oversized thin metal ring that fits over the pipe end and over the part of the fitting positioned in the pipe end. A raised portion of the ring is "pinched" together, reducing the overall circumference of the clamp and squeezing the clamp against the pipe and the underlying fitting. The pinched area of the clamp formed a raised nub that extends radially outwardly from the remainder of the clamp. The nub has a relatively narrow neck with an enlarged, outwardly-extending head. The traditional manner of removing the clamp is to twist the nub back and forth several times with pliers or some similar tool until the nub fatigues at the neck and breaks. This technique often damages the pipe end, making it necessary to replace the pipe. In some situations where there is not sufficient additional length to permit trimming the damaged end portion and reusing the remaining pipe, replacement of a long length of pipe may be necessary, which may involve disconnecting and replacing other fittings.

A prior art tool comprises a metal body that has a slot on one end that extends diametrically through the end from one side of the tool to the opposing side. The clamp nub is placed in the slot, and then the tool is twisted using a handle to break the nub away from the clamp so that it can be removed from the pipe. While advantageous in comparison with other removal techniques, the prior art tool is difficult to use because the slot extends completely across the end of the tool and allows the nub to slip out of the slot during twisting. This is particularly problematic when working in cramped areas, such as in closets and in crawlspaces where it may not be possible to place the tool on the nub in a perpendicular direction to the direction of twisting. In such instances, there is a tendency for the twisting motion to drive the nub out of one or the other ends of the slot.

There is therefore a need for a pinch clamp removal tool that more efficiently removes pinch clamps from pipes.

SUMMARY OF THE INVENTION

It is therefore an object of the present invention to provide a simple and efficient way of removing pinch clamps from the pipe without damaging the pipe.

It is another object of the invention to provide a tool that is easily placed onto a pinch clamp nub and remains on the nub during twisting removal of the clamp.

It is another object of the invention to provide a pinch clamp removal tool that is usable with conventional socket wrench handles.

These and other objects and advantages of the invention are achieved by providing a pinch clamp removal tool that includes a tool body having a slot extending partially across a top portion of the tool body and adapted for receiving a nub extending radially-outwardly from a pinch clamp to be removed from a pipe and a stop positioned at an interior end of the slot for engaging the nub when the nub is fully positioned in the slot. The tool body is adapted for being rotated to impart a twist to the pinch clamp nub sufficient to break the nub in order to loosen the pinch clamp and permit removal of the clamp from the pipe.

According to another embodiment of the invention, the stop is an integrally formed part of the tool body.

According to another embodiment of the invention, the tool body includes a relatively small-diameter segment and a relatively large-diameter segment.

According to another embodiment of the invention, the slot is formed in the small-diameter segment and a handle-receiving opening is formed in the large-diameter segment.

According to another embodiment of the invention, the tool body includes a radially-extending hole in the large-diameter segment of the tool body for receiving a spring-loaded retention ball of a handle.

According to another embodiment of the invention, a handle is provided for manually rotating the tool body and thereby twisting the nub positioned in the slot to breaking so that the pinch clamp is loosened from engagement with the pipe and can be removed.

According to another embodiment of the invention, the tool body is steel.

According to another embodiment of the invention, a pinch clamp removal tool is provided that includes a tool body having a slot extending partially across a top portion of the tool body and adapted for receiving a nub extending radially-outwardly from a pinch clamp to be removed from a pipe. A stop is integrally formed in the tool body and positioned at an interior end of the slot for engaging the nub when the nub is fully positioned in the slot. The tool body is adapted for being rotated to impart a twist to the pinch clamp nub sufficient to break the nub in order to loosen the pinch clamp and permit removal of the clamp from the pipe. The tool body includes a relatively small-diameter segment and a relatively large-diameter segment. The slot is formed in the small-diameter segment and a handle-receiving opening is formed in the large-diameter segment.

According to another embodiment of the invention, a method of removing a pinch clamp from a pipe is provided and includes the steps of providing a tool that includes a tool body having a slot extending partially across a top portion of the tool body and adapted for receiving a nub extending radially-outwardly from a pinch clamp to be removed from a pipe, and a stop positioned at an interior end of the slot for engaging the nub when the nub is fully positioned in the slot. The nub of a pinch clamp is placed in the slot of the tool body and against the stop at the interior end of the slot. The tool is rotated while the nub is against the stop to impart a twist to the pinch clamp nub sufficient to break the nub in order to loosen the pinch clamp and permit removal of the clamp from the pipe and the tool is removed from the clamp.

According to another embodiment of the invention, the method includes the step of using a handle to rotate the tool body.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
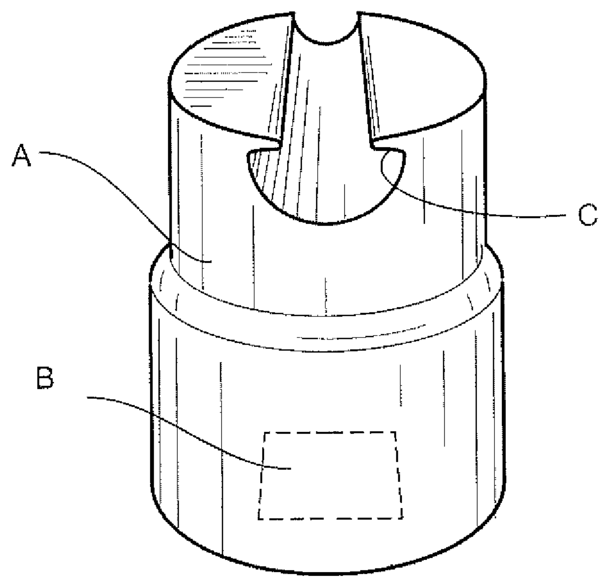
PRIOR ART FIG. 1
FIG. 1 is a perspective view of a prior art pinch clamp removal tool.

Referring now to the drawings, a prior art pinch clamp removal tool is shown in FIG. 1 and includes a metal body A that includes an opening B on one end for receiving a handle (not shown), and a slot C on the other end of the body A that extends diametrically and fully across the end of the body from one side to the other. As described above, the prior art tool is difficult to use because the slot C extends completely across the end of the tool and allows the nub to slip out of the slot during twisting. This is particularly problematic when working in cramped areas, such as in closets and in crawlspaces where it may not be possible to place the tool on the nub in a perpendicular direction to the direction of twisting. In such instances, there is a tendency for the twisting motion to drive the nub out of one or the other ends of the slot.

Figure 2:
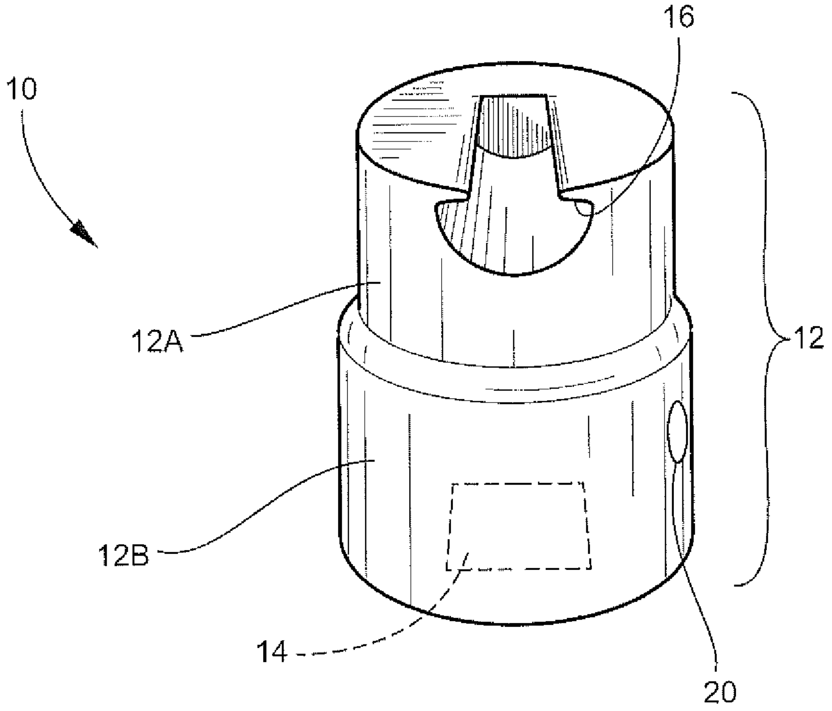
FIG. 2 is a perspective view of a pinch clamp removal tool according to an embodiment of the invention.

Referring now to FIG. 2, a pinch clamp removal tool 10 is shown and includes a body 12 that has a relatively small diameter segment 12A and an integrally formed large diameter segment 12B. A handle-receiving opening 14 permits use with an L-shaped handle 30, see FIGS. 3, 4 and 5, or a conventional socket wrench handle (not shown). A hole 20 in the large diameter segment 12B of the body is positioned to receive a spring-loaded retention ball found on some wrench handles.

The end of the tool body 12 opposite the handle-receiving opening 14 is provided with a slot 16 that extends only partway across the top of the tool body. A stop 18 between an interior end of the slot 16 and one side of the top of the tool body 12 prevents movement of the nub of the pinch clamp completely through the slot and out the other end. The slot 16 has a relatively narrow opening of sufficient width to receive the neck of the nub. The slot 16 opens into a larger, tubular-shaped area of sufficient size to receive the head of the nub.

Figure 3:
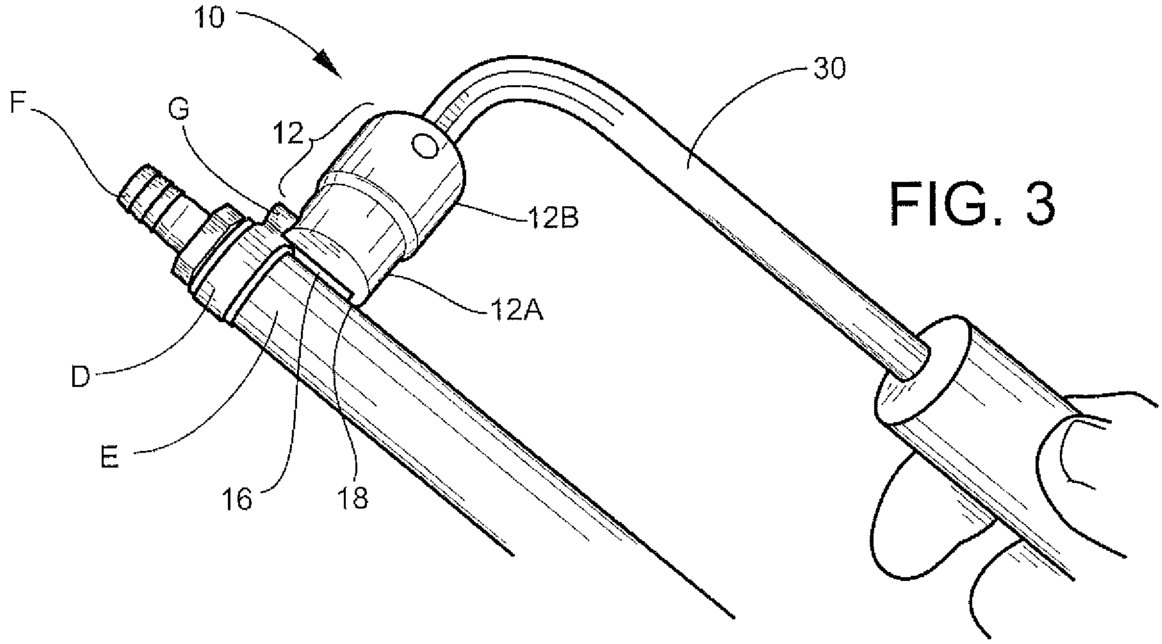
FIG. 3 shows placement of the removal tool onto the nub of a pinch clamp.
Figure 4:
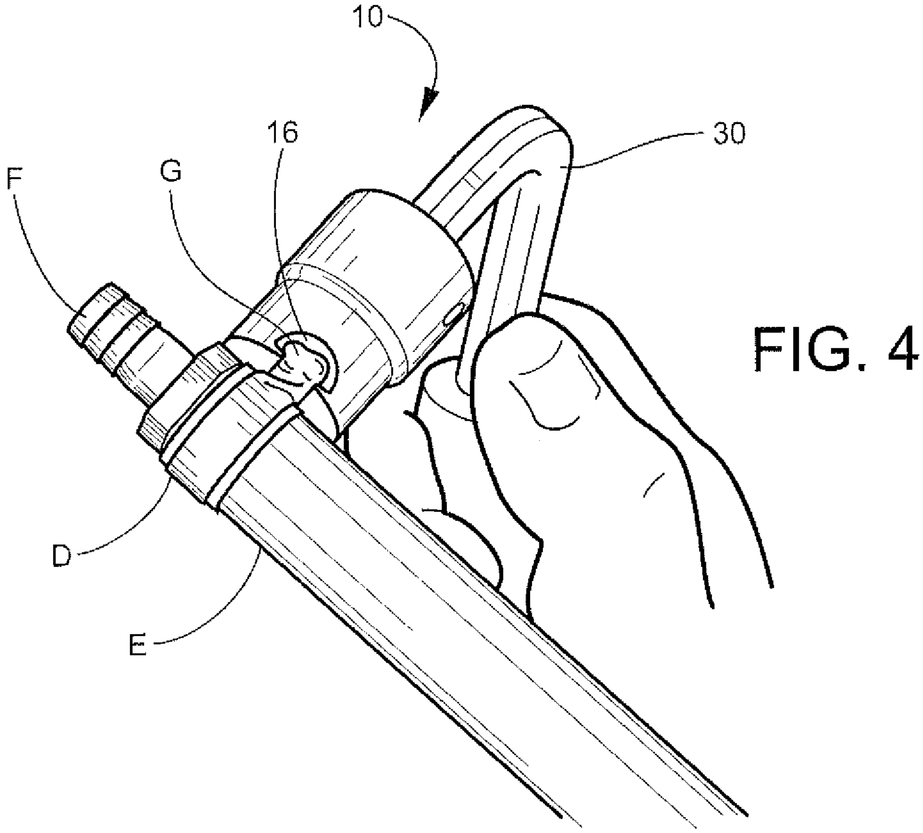
FIG. 4 shows the twisting motion used to break the nub of the pinch clamp.
Figure 5:
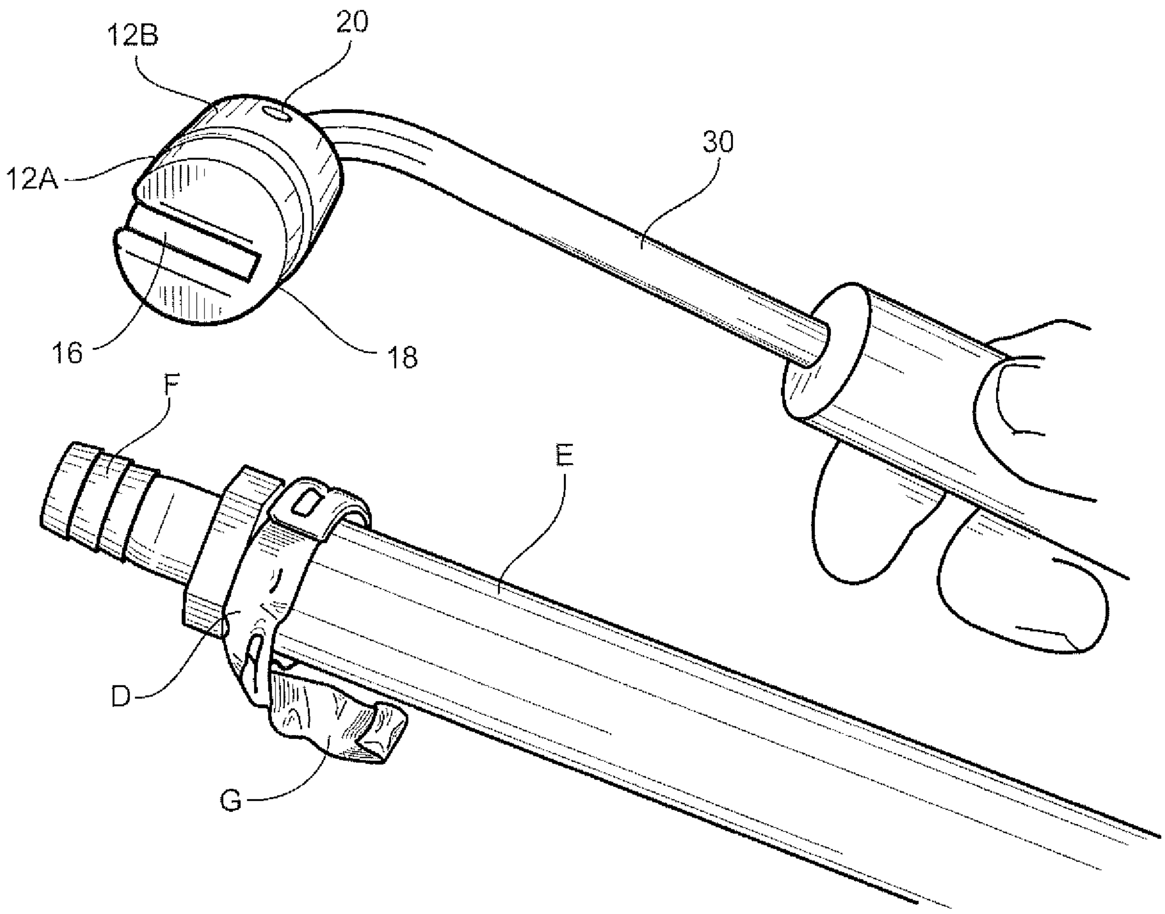
FIG. 5 shows removal of the tool from the broken nub and the condition of the pinch clamp when ready for removal from the pipe.

Referring now to FIGS. 3, 4 and 5, the pinch clamp removal tool 10 is shown in use. As shown in FIG. 3, the tool 10 is used to remove a pinch clamp D from a pipe end E, such as a PEX pipe, so that a fitting F can be removed from the pipe end E. The clamp D includes a raised nub G as described above, with a narrow neck and a relatively large head. To break the nub G and enable the clamp D to be removed, the tool body 12 is moved onto the nub G, with the nub G extending into the slot 16 until it is engages the stop 18. By applying force to the tool body 12 in the direction of the stop 18, the nub G is held securely in place in the slot 16 without regard to whether or not the body 12 is fully perpendicular to the nub G.

Referring to FIG. 4, the handle 30 is rotated, twisting the nub G in the slot 16 until the nub G breaks at its neck and the clamp loosens. Then, as shown in FIG. 5, the tool 10 is removed from the clamp D and the clamp D removed from the pipe end E without damage to the pipe end E.

Any suitable device can be used to rotate the tool 10, including the above-mentioned handle 30, a conventional socket wrench handle.

A pinch clamp removal tool according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A pinch clamp removal tool, comprising:

(a) a tool body having a slot extending partially across a top portion of the tool body with one open end of the slot communicating with an end edge of a top portion of the tool body and adapted for receiving a nub extending radially-outwardly from a pinch clamp to be removed from a pipe;

(b) the slot having an elongate bottom tubular-shaped area defined in the tool body for receiving the pinch clamp and nub, and communicating with an elongate top opening in the slot having opposed inwardly facing edges spaced-apart from each other by a width less than a width of the nub for engaging the nub of the pinch clamp extending into the width of the elongate top opening in the slot, and adapted for retaining the nub of the pinch clamp in the slot in both a longitudinal direction and a vertical direction relative to the slot;

(c) a nub stop positioned at one end of the slot for engaging the nub when the nub is positioned in the slot and into the width of the elongate top opening in the slot, and preventing the nub from being freely rotated in the slot and from exiting the slot at the one end of the slot, the tool body adapted for being rotated to impart a twist to the pinch clamp nub extending into the width of the elongate top opening in the slot, to break the nub in order to loosen the pinch clamp and permit removal of the clamp from the pipe;

(d) the tool body including a small-diameter segment and an integrally-formed coaxial large-diameter segment;

(e) an opening in the large-diameter segment of the tool body for receiving a handle for rotating the tool body;

(f) the slot formed in the small-diameter segment of the tool body;

(g) a radially extending hole in the large-diameter segment of the tool body for receiving a spring-loaded retention ball of a handle; and (h) a handle for being positioned in the opening of the large-diameter segment of the tool body for manually rotating the tool body and thereby twisting the nub positioned in the slot to breaking so that the pinch clamp is loosened from engagement with the pipe and can be removed, the handle having a relatively short proximal segment for being inserted into the opening in the tool body and a relatively long grasping segment formed at a right angle to the proximal segment to permit manual rotation of the pinch clamp removal tool.

2. A pinch clamp removal tool according to claim 1, wherein the stop is an integrally-formed part of the tool body.

3. A pinch clamp removal tool according to claim 2, wherein the tool body includes a relatively small-diameter segment and a relatively large-diameter segment.

4. A pinch clamp removal tool according to claim 3, wherein the slot is formed in the small-diameter segment and a handle-receiving opening is formed in the large-diameter segment.

5. A pinch clamp removal tool according to claim 4, and including a radially extending hole in the large-diameter segment of the tool body for receiving a spring-loaded retention ball of a handle.

6. A pinch clamp removal tool according to claim 1, and including a handle for manually rotating the tool body and thereby twisting the nub positioned in the slot to breaking so that the pinch clamp is loosened from engagement with the pipe and can be removed.

7. A pinch clamp removal tool according to claim 1, wherein the tool body is steel.

* * * * *